UNITED STATES PATENT OFFICE.

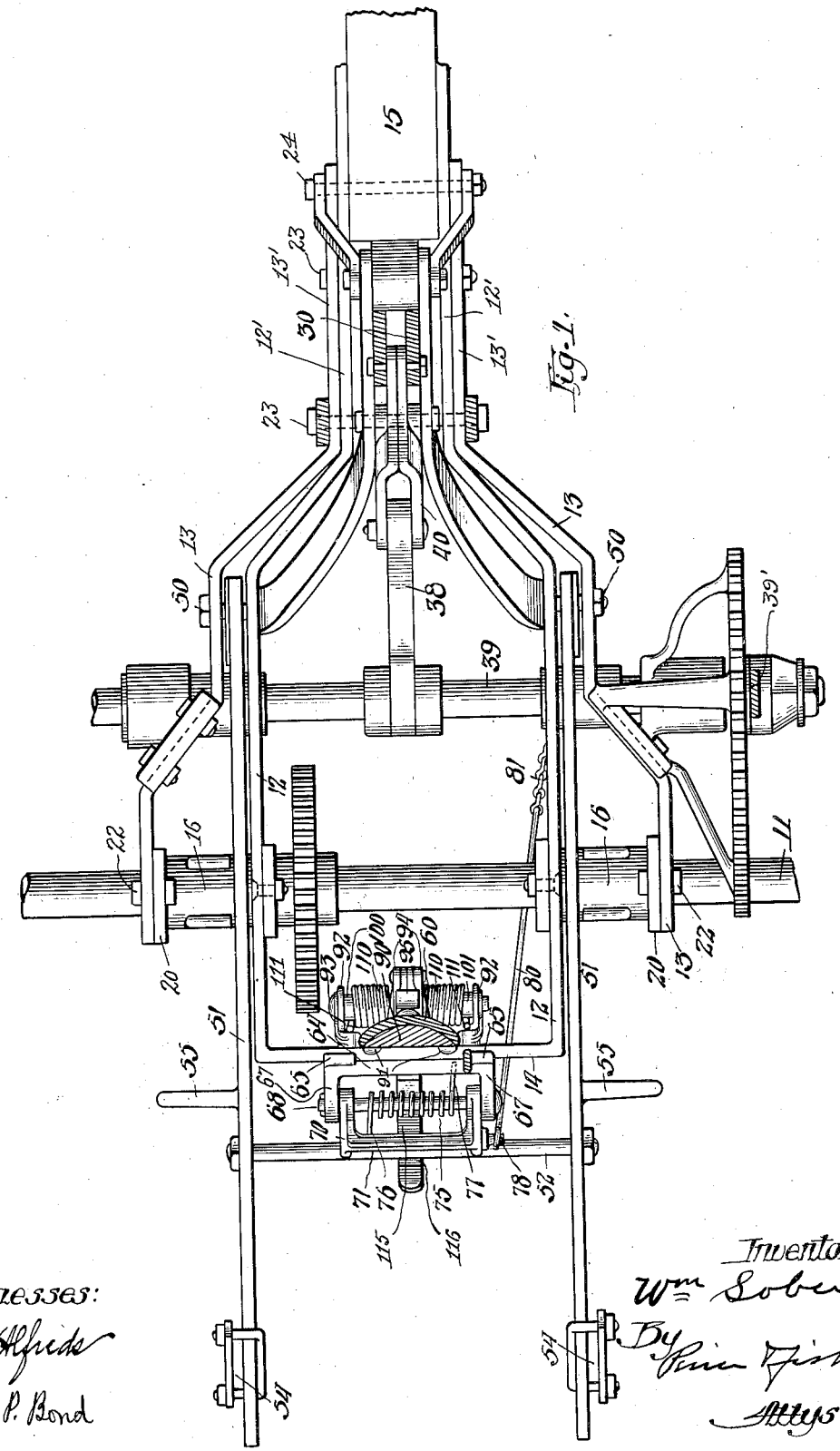

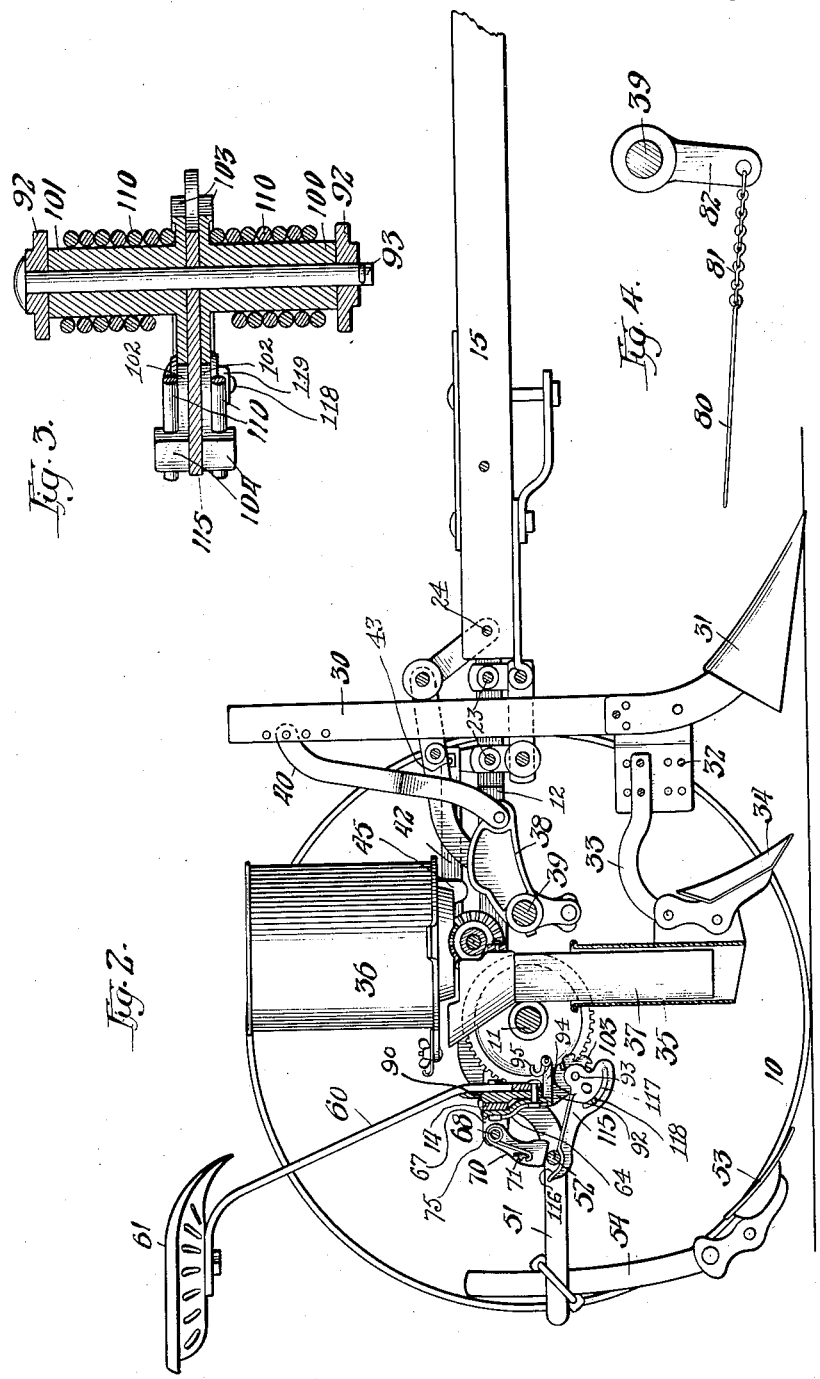

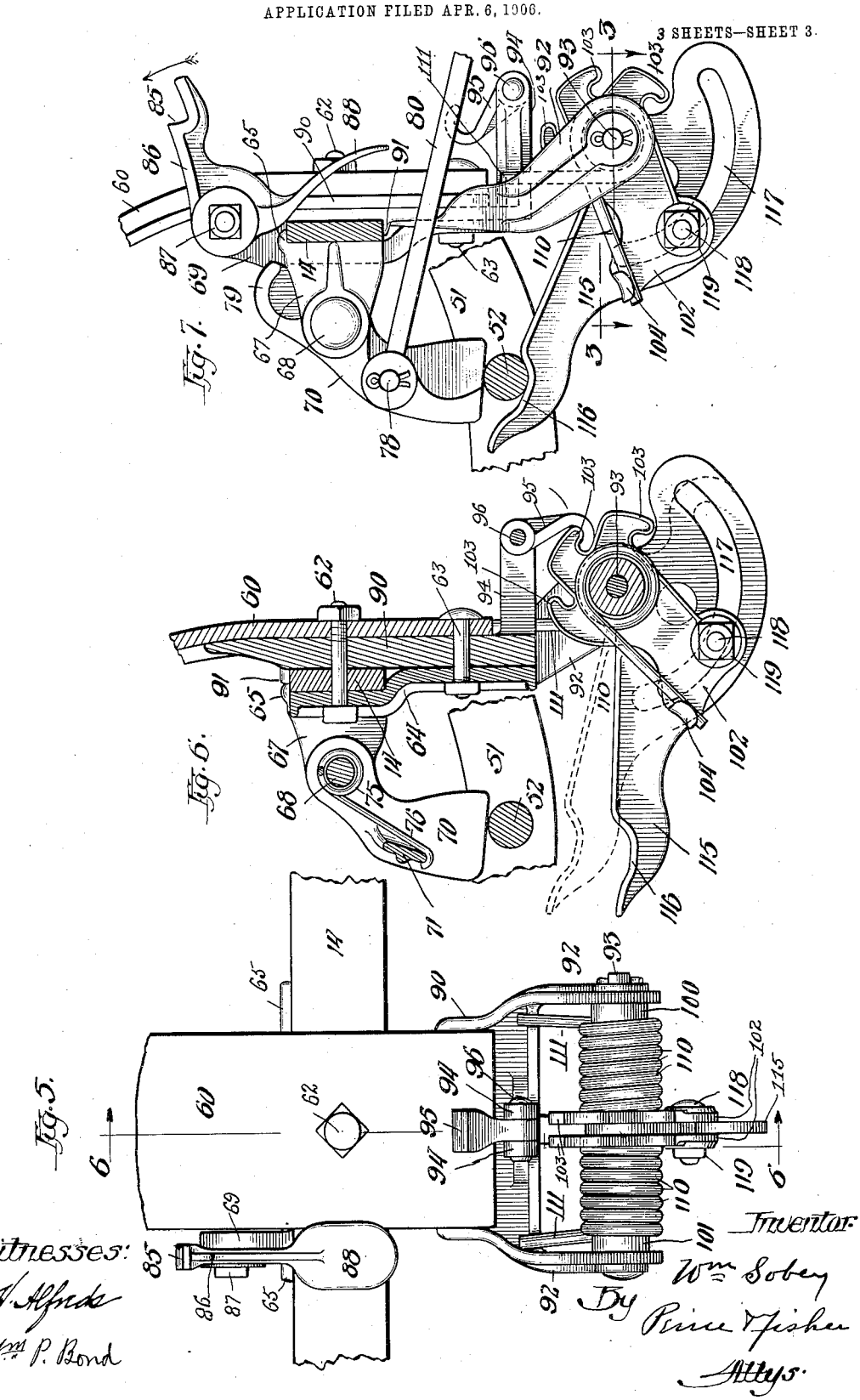

WILLIAM SOBEY, OF RACINE, WISCONSIN, ASSIGNOR TO J. I. CASE PLOW WORKS, OF RACINE, WISCONSIN, A CORPORATION.

PLANTER.

No. 836,471.   Specification of Letters Patent.   Patented Nov. 20, 1906.

Application filed April 6, 1906. Serial No. 310,277.

*To all whom it may concern:*

Be it known that I, WILLIAM SOBEY, a citizen of the United States, and a resident of Racine, in the county of Racine and State of Wisconsin, have invented certain new and useful Improvements in Planters, of which I do declare the following to be a full, clear, and exact description, reference being had to the accompanying drawings, forming part of this specification.

The present invention has relation more particularly to that type of planters commonly known as "combined corn and cotton" planters, although features of the invention will be found susceptible of use in other machines.

In the accompanying drawings the invention is shown as applied to a planter the main features of which are fully set forth and claimed in an application for Letters Patent filed by me in the United States Patent Office June 22, 1904, Serial No. 213,608.

Planters of the type to which my invention relates are provided with a furrow-opener, with seed mechanism for depositing the seed at the rear of the furrow-opener, and with a furrow-closing device for covering the seed after it has been dropped. In this class of machines it frequently happens when planting upon uneven ground that it is desirable to depress the furrow closer or closing devices below their normal working position, so as to effectively secure the covering of the grain.

One object of the present invention is to provide a spring-support for the furrow-closing devices so arranged that the furrow closer or closing devices may be depressed below their normal working position in order to cultivate or close the furrow in a low place while the furrow-opener is traveling upon higher ground.

A further object of my invention is to provide improved means for adjusting the tension of the spring-support that sustains the furrow closer or closing devices.

These objects of invention are accomplished by the features of improvement hereinafter described, illustrated in the accompanying drawings, and particularly pointed out in the claims at the end of this specification.

Figure 1 is a plan view with parts shown in section and with parts removed of a planter embodying my invention. Fig. 2 is a view in vertical longitudinal section on the central line of the machine, parts being shown in elevation. Fig. 3 is a view in cross-section on line 3 3 of Fig. 7. Fig. 4 is a detail view, in vertical section, through the rock-shaft and certain parts connected thereto. Fig. 5 is a front view of the spring-support mechanism carried upon the rear bar of the inner frame of the machine. Fig. 6 is a view in central vertical section on line 6 6 of Fig. 5, and Fig. 7 is a side view of the mechanism shown in Fig. 5.

With the exception of the mechanism carried by the rear bar of the inner frame of the machine the parts hereinafter described are the same as in the planter illustrated in my above-mentioned application, Serial No. 213,608.

The supporting-wheels 10 of the machine are secured to the drive-axle 11, that passes through bearing-boxes 16, connected to the main frame of the machine. This main frame is shown as comprising the inner side bars 12 and the outer side bars 13, the inner side bars being shown as bent to form a loop, so that the rear end of the loop consists of a cross-bar 14 between the rear ends of the side bars 12. From the cross-bar 14 the side bars 12 extend forwardly in parallel relation and at their forward ends converge and terminate in forwardly-extending parallel bars 12', which overlap the side of the draft-pole or tongue 15. The rear ends of the outer side bars 13 are spaced or separated from the inner side bars 12, and upstanding lugs 20 on the outer ends of the bearing-boxes 16 are attached to the rear ends of the outer side bars 13, as at 22. At their forward ends the outer side bars converge and terminate in forwardly-extending parallel portions 13', which overlap the forward ends 12' of the inner side bars 12. The forward overlapping portions of the inner and outer side bars are secured together by bolts 23 and to the tongue 15 by the bolt 24.

Adjacent the rear end of the tongue 15 is mounted in manner free to move in vertical direction the standard 30, that carries at its lower end a suitable plow 31, and, as shown, a bracket 32 extends rearwardly from the foot of the standard 30 and is connected by a link 33 to the shank of a furrow-opener 34, that projects forwardly from the boot 35, through which the grain is delivered from the seed-can 36 by a spout 37. The standard 30 and parts connected therewith are raised to and from operative position by an arm 38, that is mounted upon rock-shaft 39, that is carried by the main frame of the machine, this arm 38 being connected to the standard 30 by a rod 40. The seed-can 36 is mounted upon a frame 42, that is pivoted, as at 43, so as to swing in upward direction when the seed-can is to be disengaged from the driving mechanism, whereby the seed is fed from the can. The raising of the seed-can to throw its driving mechanism out of action is effected by the engagement of the upper edge of the arm 38 with a lug 45, depending from the bottom of the can. Inasmuch as the above-described parts are fully set forth in my companion application Serial No. 213,608 they need not be more particularly described herein, it being sufficient to state that the raising and lowering of the standard 30 and of the seed-can is effected through the medium of a hand-lever (shown in section at 39' in Fig. 1) that is fixed to the shaft 39.

To the main frame of the machine is pivotally connected, preferably by bolts 50, that pass through the side bars 12 and 13, the frame or carrier that sustains the furrow-closing mechanism. As shown, this frame or carrier comprises side bars 51, that are connected by a cross rod or bar 52. While other forms of furrow-closing devices may be employed without departing from the scope of the invention, I prefer to use the furrow-closing shovels 53, the shanks 54 of which will be suitably attached to the rear ends of the side bars 51. From each of the side bars 51 of the carrier or frame that sustains the furrow-closers project the foot-rests 55, whereby the operator may depress the furrow-closing shovels or cultivators 53, as will hereinafter more fully appear.

To the cross-bar 14 of the main frame 12 of the machine is bolted the standard or support 60 for the operator's seat 61. To the back of the cross-bar 14 and connected thereto by a bolt 62 is a bracket 64, that is formed at its upper edge with lugs 65, that engage the upper edge of the bracket 14, the bar 64 being bent inwardly (see Fig. 6) to engage the lower edge of the bar 14. At the ends of the bracket 64 are formed the rearwardly-projecting arms 67, through which passes the bolt 68, this bolt also passing through the upper ends of the arms of the dog or detent 70, that is pivoted thereon. The arms of the dog or detent are shown as connected together by a cross-bar 71, the arms and cross-bar being preferably formed as a single casting. A coil-spring 75 encircles the bolt 68, and one end 76 of this coil-spring engages the cross-bar 71 of the dog or detent, while the opposite end 77 of the spring engages the bracket 64. The spring 75 thus serves to normally hold the dog or detent in the position shown in Figs. 1, 2, 6, and 7 of the drawings, in which position it will engage with the cross bar or rod 52 of the frame or carrier of the furrow-closers or covering-shovels. One of the arms of the dog or detent has projecting laterally therefrom a lug or stud 78, to which is connected the rod 80, the forward end of this rod 80 being attached by a chain 81 to an arm 82, that is fixed to the shaft 39. Hence it will be seen that when the rock-shaft 39 is operated in order to throw the furrow-opening mechanism and the seed-dropping mechanism out of action the rod 80 will draw forwardly the dog or detent 70, so as to disengage it from the cross-bar 52, and thus permit the frame or carrier of the furrow-closers to be raised. As shown, one arm of the dog or detent has an upward extension 79, adapted to be engaged by the shoulder 85 of the latch 86, that is pivoted at 87 to an arm 69, that rises from one end of the bracket 64. This latch 86 is formed with an extension 88, whereby it may be conveniently tripped by the operator from his position upon the operator's seat 61. When the dog or detent 70 has been withdrawn from engagement with the rod or cross-bar 52, the upward extension 79 of the dog or detent will be in position to be engaged by the shoulder 85 of the latch 86 when the latch is turned backward in the direction of the arrow, Fig. 7, and when the latch thus engages the extension 79 it will hold the dog or detent 70 out of the path of the rod 52, so that the frame or carrier that sustains the covering-shovels may be freely lifted, all as clearly set forth in the prior application referred to.

In order to provide the covering-shovels or other closing mechanism with a yielding support, so that the operator can whenever desired depress the covering-shovels to cultivate in a low place or spot of ground, I have provided the mechanism next to be described.

To the cross-bar 14 of the main frame 12 is bolted a bracket 90, that is attached to the front of the cross-bar and to the bracket 64 by the bolts 62 and 63, this bracket 90 being preferably interposed between the cross-bar 14 and the standard 60 of the operator's seat 61. As shown, the bracket 90 is provided with lugs 91, that engage the top and bottom edges of the cross-bar 14. The bracket 90 is provided at its lower end with depending arms 92, through which passes the bolt 93. Upon this bolt 93 are mounted the long hubs 100 and 101, from the inner ends of which project rearwardly the arms 102 and forwardly the hooks 103, these arms 102 and hooks 103 being preferably formed integral with the hubs. Each of the arms 102 is formed with a lug 104, that will engage one end of the supporting-spring 110, that is coiled around its corresponding hub 100 and 101 and has its opposite end 111 turned upwardly and engaging the lower portion of the bracket 90, as clearly shown in Figs. 5 and 7 of the drawings. Each of the supporting-springs 110 is similarly arranged upon its respective hub 100 or 101, and each of the supporting-springs exerts its power toward lifting the arm 102, to which the rearwardly-extending end of the spring 110 is attached. (See Figs. 6 and 7.) Between the hubs 100 and 101 and the adjacent arms 102 is mounted the supporting-arm 115, that is perforated to receive the bolt 93, whereon it is pivotally mounted. The outer end of the arm 115 is preferably formed with a seat 116 to receive the rod 52. A segmental slot 117 is formed in the arm 115 or in the casting of which this arm is a part, this segmental slot 117 receiving a bolt 118, that passes through holes formed in the arms 102, the bolt being retained in position by its head at one end and by a nut 119 at the opposite end. From the foregoing description it will be seen that by means of the bolt 118 the tension exerted by the coiled supporting-springs 110 upon the supporting-arm 115 can be varied as desired. Thus it is obvious that if the bolt 118 be moved downward and toward the front of the slot 117, carrying the arms 102 with it, the springs 110 will be more tightly coiled or wound, and the nearer the bolt 118 is set toward the front of the slot 117 the greater will be the lifting force exerted by the springs upon the supporting-arm 115. Hence it will be seen that by thus changing the tension of the springs 110 the frame or carrier that sustains the furrow closers or shovels may be held with any desired degree of spring resistance to its downward movement.

As the adjustment of the bolt 118 along the slot 117 would be a matter of considerable difficulty because of the force exerted by the lifting-springs 110, I have provided the mechanism next to be described for holding the springs under tension at different points while the arm 115 is being adjusted with respect to the arms 102.

From the bottom of the bracket 90 projects downwardly the bifurcated lug 94, between the arms of which is pivoted a hook 95 upon a bolt 96. This hook 95 is normally in idle position, as shown in Fig. 7. When, however, it is desired to change the tension of the spring 110, the arm 115 will be moved downward—say from the position shown by full lines in Fig. 7 to the position shown in Fig. 6 of the drawings—and the hook or latch 95 will be turned downward, so as to engage the corresponding hooks 103, projecting downwardly from the inner ends of the hubs 100 and 101. When the latch 95 is thus in engagement with the hooks 103, it will serve to resist the reverse movement of the arms 102 and will thus hold the lifting-springs 110 under tension. The operator will then loosen the nut 119 on the bolt 118 and move the lifting-arm 115 upward—say to the new position shown by dotted lines in Fig. 6—and will then clamp the nut 119, so as to securely lock the arm 115 in its adjusted position. The latch 95 will then be released from the hooks 103 and will be turned back to the idle position shown in Fig. 7. It will be understood, of course, that the hook 95 may be made to engage with either set of hooks 103, according to the tension to be given to the lifting-springs 110.

From the foregoing description it will be seen that the frame or carrier that sustains the furrow closers or shovels 53 may be held against upward movement by means of the dog or detent 70 when this dog or detent is in the position shown in the drawings; but inasmuch as the supporting-arm 115 that engages the cross-bar 52 of this frame or carrier is sustained by the springs 110 it is obvious that the operator from his position upon his seat 61 can by the pressure of his foot upon the foot-rest 55 (see Fig. 1) depress the frame or carrier so as to cause the covering-shovels or other furrow-closing devices to reach and cultivate low spots in the ground, notwithstanding the fact that the wheels may be passing over higher points that would tend to lift the furrow-closers out of operative position. When it is desired to throw the furrow-opener, seed mechanism, and the furrow-closers out of action, the operator can do this by turning the rock-shaft 39, through the medium of a hand-lever, (not shown,) as this turning of the rock-shaft serves to withdraw the dog or detent 70 from engagement with the cross-bar 52 of the furrow-closer frame or carrier.

While I have described the preferred embodiment of my invention, I do not wish the invention to be understood as limited to the details of construction described, as these may be modified within wide limits without departure from the spirit of the invention. I do not wish to be understood as claiming in this application the subject-matter set forth in my companion application, Serial No. 213,608.

Having thus described my invention, what I claim as new, and desire to secure by Letters Patent, is—

1. The combination with a furrow-closer and its carrier or frame and a stop device for checking the upward movement of the furrow-closer, of a lift-spring support for said furrow-closer, arranged to permit it to be depressed below its normal working position.

2. The combination with a furrow-closer and its carrier or frame, of an adjustable lift-spring support for said furrow-closer, arranged to permit it to be depressed below its normal working position.

3. The combination with the furrow-closer and its carrier or frame, of an arm for sustaining said carrier or frame, a lift-spring connected to said arm, and means for varying the lifting force of said spring-supporting arm.

4. The combination with vertically-movable bars or frame provided with shovels or furrow-closing means, of a supporting-arm for sustaining said bars or frame, a spring for exerting pressure upon said supporting-arm to enable it to sustain said bars or frame, and means for holding the spring under tension while the adjustment of the supporting-arm with respect to the spring is effected.

5. The combination with vertically-movable shovel-carrying bars provided with a transverse bar connecting them, of a supporting-arm extending beneath said transverse bar, a spring adjustably connected with said supporting-arm, whereby the lifting force of said arm may be varied and means for holding said spring under tension while the adjusting-arm is moved independently of said spring.

6. The combination with a vertically-movable frame or bars carrying shovels or furrow-closing means, of a supporting-arm for said frame or bars, a coil-spring for lifting said supporting-arm, a revoluble arm to which said coil-spring is connected, said revoluble arm being adjustably connected to said supporting-arm, and means for locking said revoluble arm to hold the spring under tension while the supporting-arm is adjusted with respect to said revoluble arm.

7. The combination with a vertically-movable frame or bars carrying shovels or furrow-closing means, of a supporting-arm, a rod whereby said supporting-arm is pivotally sustained, a revoluble arm adjustably connected to said supporting-arm and provided with one or more hooks or offsets, a coil-spring connected to said revoluble arm and a latch arranged to engage said hooks or offsets with said revoluble arm in order to hold the coil-spring under tension while the supporting-arm is being adjusted with respect to said revoluble arm.

8. The combination with a furrow-opener, with seed-dropping mechanism and with means for throwing said furrow-opener and said seed-dropping mechanism into and out of operation, of a furrow-closer, means for shifting said furrow-closer and a spring-support for said furrow-closer, arranged to permit the furrow-closer to be depressed below its normal working position and independently of said furrow-opener.

WILLIAM SOBEY.

Witnesses:
DANIEL EVAN HOWELL,
GEORGE HENRY BOLTON.